Oct. 2, 1962   A. J. HOVDE   3,056,638
PISTON AND CONNECTING ROD ASSEMBLY
Filed Jan. 23, 1961
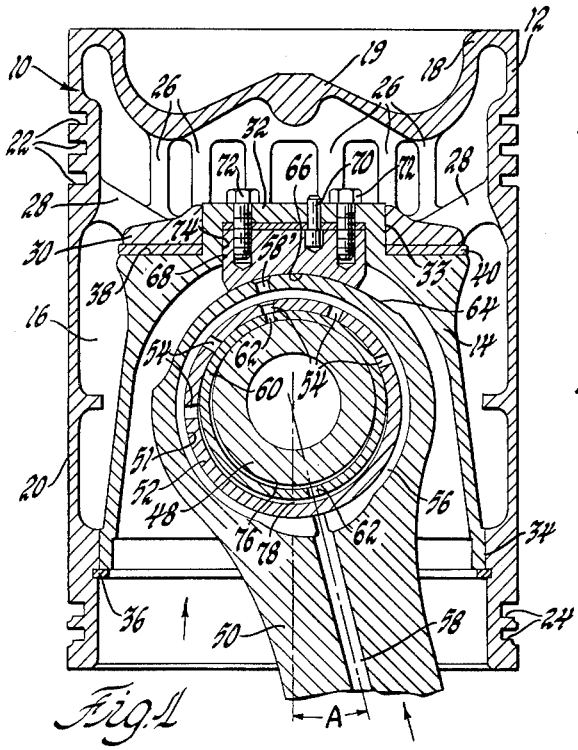
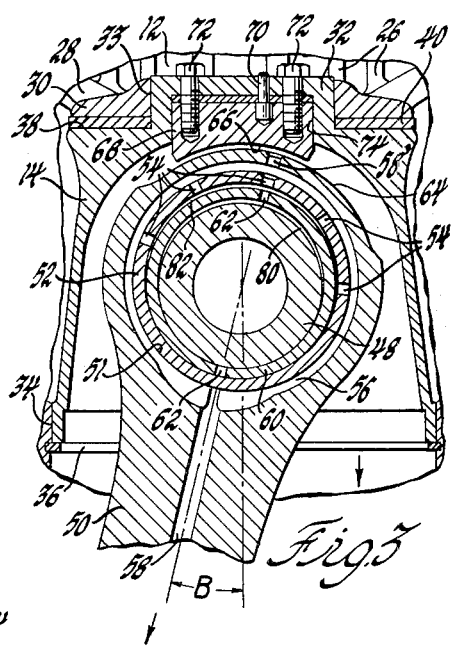
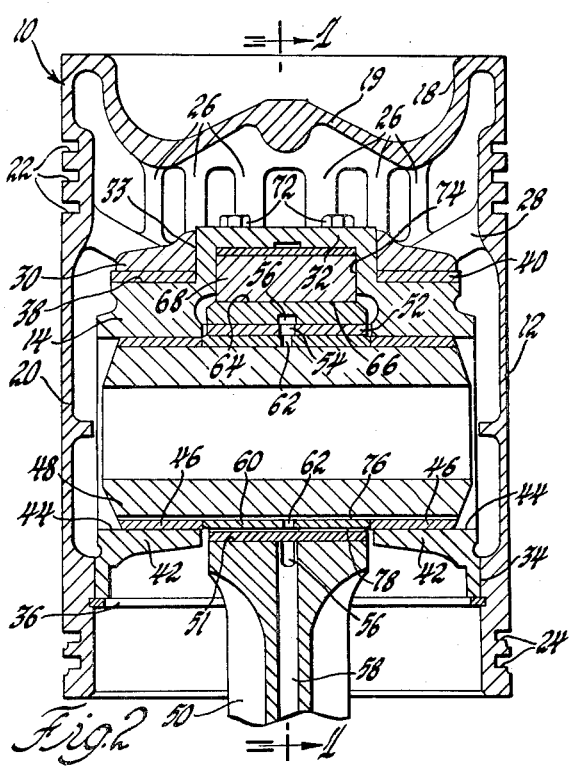
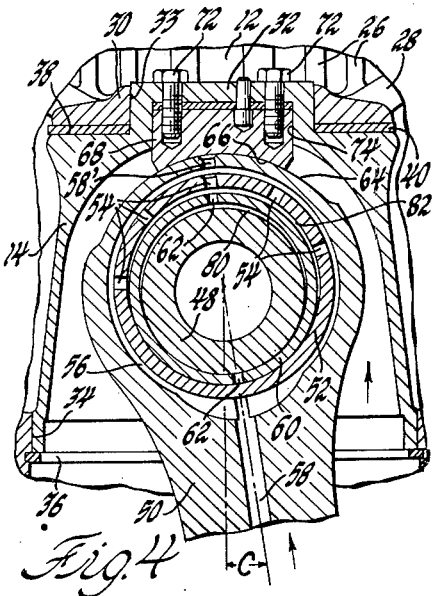
INVENTOR.
Arne J. Hovde
BY
E. E. James
ATTORNEY United States Patent Office 3,056,638
Patented Oct. 2, 1962

3,056,638
PISTON AND CONNECTING ROD ASSEMBLY
Arne J. Hovde, Rocky River, Ohio, assignor to General Motors Corporation, Detroit, Mich., a corporation of Delaware
Filed Jan. 23, 1961, Ser. No. 83,992
8 Claims. (Cl. 309—6)

This invention relates to an internal combustion engine and more particularly to a piston and connecting rod assembly having a wrist pin type pivotal connection.

In turbocharging or otherwise upgrading existing high speed, high compression engines and in designing new more compact engines to meet the ever increasing demand for more power, the high unit bearing loads necessarily imposed on the limited effective bearing surfaces of wrist pin type pivotal connections have made it extremely difficult to insure adequate lubrication of these surfaces during power stroke load transmittal.

The instant invention contemplates an improved piston and connecting rod assembly having provision for briefly lifting the piston wrist pin relative to the connecting rod as the piston approaches its top center position. This unloads the wrist pin and permits the supplied pressurized lubricant to fill the resultant momentarily increased clearances between the primary load transmitting surfaces of the pivotal connection. An adequate lubrication film is thus provided between these surfaces immediately prior to combustion and the subsequent power stroke. The operating durability and life of the wrist pin and connecting rod bearings are thereby substantially increased with consequential reductions and economies in service maintenance and engine repair downtime.

The foregoing and other objects, advantages and features of the invention will be more thoroughly understood from the following description of a preferred illustrative embodiment having reference to the accompanying drawing, in which:

FIGURE 1 is a vertical transverse sectional view of a two-piece piston and connecting rod assembly embodying the invention and is taken substantially in the plane of the line and in the direction of the arrows indicated at 1—1 of FIGURE 2;

FIGURE 2 is a similar sectional view of the piston and connecting rod assembly of FIGURE 1 taken substantially in a plane normal to that of FIGURE 1;

FIGURE 3 is a fragmentary sectional view corresponding to a portion of FIGURE 1 and shows an instantaneous operative relationship between the several components during the power stroke of the piston; and FIGURE 4 is a view similar to FIGURE 3 showing another instantaneous relationship which is achieved between the several components early in the upward compressive stroke of the piston.

Referring more particularly to the drawing, the piston and connecting rod assembly includes a two-piece piston 10 particularly adapted for use in a turbocharged two-cycle internal combustion engine of the compression ignition type. The piston 10 comprises an outer piston member 12 and an inner carrier member 14 which define a cooling oil receiving chamber 16 therebetween. The outer piston member has an upper head portion 18 defining a semi-turbulent toroidal combustion chamber bowl 19 and has a cylindrical skirt portion 20 extending longitudinally therefrom. The piston skirt has an upper belt of outwardly facing compression ring mounting grooves 22 formed adjacent the head portion and two outwardly facing oil control ring mounting grooves 24 adjacent the opposite end thereof.

The upper load carrying head and compression ring mounting skirt portions are structurally reinforced by a plurality of equiangularly spaced struts 26 and 28 and by an annular thrust collar 30 interconnecting the several struts. The thrust collar 30 is spaced longitudinally of the combustion chamber bowl and concentrically inwardly and slightly below the compression ring mounting skirt portion. The struts 26 serve as primary load carrying members and extend longitudinally and arcuately between the bowl portion of the piston head. The struts 28 extend radially and obliquely between the thrust collar and the compression ring mounted belt skirt portion and serve to provide radial side thrust rigidity to the thrust collar and compression ring mounting belt portion.

The carrier member 14 has an upper cylindrical boss 32 journaled at 33 in the central opening through the thrust collar 30 and is journaled adjacent its lower end at 34 by the lower skirt portion of the piston member immediately above the ring grooves 24. In assembly, a carrier retaining ring 36 is inserted in an inwardly facing groove provided in the lower piston's skirt portion. This ring engages the lower axial end of the carrier skirt and maintains an annular thrust shoulder 38 extending radially of the upper reduced diameter journal boss 32 in bearing engagement with an annular thrust bearing or washer 40 seated or carried by the thrust collar 30. The carrier 14 has two diametrically aligned wrist pin mounting bosses 42 intermediate its ends. These bosses define aligned openings 44 each having a sleeve or bushing 46 mounted therein. The bushings 46 in turn journal the opposite ends of a hollow wrist pin 48 which is inserted therethrough to provide the pivotal connection with the upper small bearing end of a connecting rod 50.

The upper end of the connecting rod 50 has on opening 51 therethrough which spacedly embraces the wrist pin 48. A sleeve bushing 52 is inserted in this opening for movement with the connecting rod and has a plurality of angularly spaced radial ports 54 opening through its upper portion and intersecting an annular inwardly facing lubricant distribution groove 56 located centrally of the rod opening 51. The groove 56 intersects a lubricant supply passage 58 which is drilled longitudinally of the connecting rod. At its distal end, the passage is connectable in a conventional manner to associated passages in the engine crankshaft and frame, not shown, to the pressurized lubricant supply of the engine. A floating bushing 60 is interposed between and has normal bearing clearances with the connecting rod bushing 52 and the wrist pin. This floating bushing has at least two equiangularly spaced radial ports 62 therein supplying pressurized lubricant to the wrist pin bearing surface.

In accordance with the invention, the upper end of the connecting rod is provided with an arcuate cam surface 64 formed on a radius slightly eccentric to the pivot axis are defined by the wrist pin. During certain portions of the piston stroke cycle as explained in greater detail below, this eccentric cam surface on the connecting rod is engageable with a mating eccentric cam following surface 66 carried by the carrier member to effectively lift the piston pin relative to the connecting rod. In the illustrative embodiment, this cam following surface is formed on a cam follower pad or disc 68 which is suitably oriented and secured by a dowel pin 70 and bolts or screws 72 within a circular recess 74 formed within the upper journal boss of the carrier. Lubrication of the mating cam and follower surfaces is provided through an orifice 58′ formed in the small bearing end of the connecting rod while drilling the supply passage 58.

In FIGURES 1 and 2, an instantaneous angular relationship A is shown between the connecting rod and piston corresponding to that achieved as the piston reaches 90° before its top center position. In this position, bearing engagement between the eccentric cam surfaces 64 and 66 transmits the compression effecting forces acting therebetween and effectively lifts the wrist pin relative to the connecting rod to provide increased clearances 76 and 78 between the primary load transmitting surfaces of the pin, the floating bushing 60 and the rod bushing 52, respectively. As the piston further approaches its top center position, i.e. at about 40° therebefore in the illustrative embodiment, the cam bearing surfaces 64 and 66 are carried out of engagement thus transferring or returning load transmittal to the wrist pin pivotal connection and the viscous oil films interposed between the several bearing surfaces thereof. As the piston passes through its firing and top center position, the expansive combustion pressures act on the head of the piston and force the piston downwardly through what is called the power stroke. In transmitting the forces applied thereto, the wrist pin pivotal connection tends to minimize the viscous film of lubricant between the primary load transmitting surfaces of the floating bushing 60 and the rod bushing 52 and increases the clearances between these members at 80 and 82 on the opposite sides thereof. This is best seen in FIGURE 3 which shows an angular relation B between the piston and connecting rod corresponding to a position of the piston 90° after passing through its top center position. Upon passing through their bottom center positions, the piston and connecting rod begin their compression or upward stroke. At approximately 40° past the bottom center position which corresponds to the piston and connecting rod angular relationship C shown in FIGURE 4, bearing engagement is again effected between the eccentric bearing cam surfaces 64 and 66 with subsequent momentary lifting of the piston wrist pin relative to the rod and floating bushings 52 and 60.

While the foregoing description has been limited to a single preferred illustrative embodiment, it will be apparent that various modifications and changes might be made therein without departing from the spirit and scope of the invention as defined in the following claims.

I claim:

1. In a piston and connecting rod assembly for an internal combustion engine, a hollow piston member having spaced wrist pin mounting openings therein, a wrist pin mounted and extending between said openings, a connecting rod pivotally mounted on said wrist pin intermediate the mounted ends thereof, passage means associated with said connecting rod for supplying pressurized lubricant to the pivotal bearing surfaces of said rod and wrist pin, said connecting rod having an arcuate bearing surface thereon eccentrically disposed of the wrist pin pivot axis, and said piston member having a second arcuate bearing surface thereon similarly eccentric of said wrist pin axis and mateable with said first eccentric bearing surface during oscillatory movement of said connecting rod carrying said piston toward its top center position thereby lifting said pin relative to the pivotal surfaces of said connecting rod to insure adequate lubrication therebetween as the piston passes through its top center position and downwardly on its power stroke.

2. In a piston and connecting rod assembly for an internal combustion engine, a piston member having spaced aligned openings therein, a wrist pin journaled in said openings, a connecting rod having one end thereof mounted on said wrist pin intermediate said openings for pivotal movement with respect to said piston and having an arcuate bearing surface formed thereon eccentrically of the wrist pin pivot axis, said piston member having an arcuate bearing surface thereon engageable with the bearing surface on said rod for load transmittal therebetween during oscillatory movement of said rod carrying said piston toward its top center position, means for supplyying lubricant to the pivotal bearing surfaces of said wrist pin and bearing engagement between said piston and rod bearing surfaces shifting said pin relative to its primary load transmitting journaling surfaces to insure adequate lubrication therebetween as the piston passes through its top center position and downwardly on its power stroke.

3. A piston and connecting rod assembly for an internal combustion engine comprising a piston member having aligned wrist pin mounting openings therein, a wrist pin journaled in and extending between said openings, a connecting rod having one end thereof mounted on said wrist pin for pivotal load transmitting movement with respect to said piston and having an arcuate bearing surface formed thereon eccentrically of the wrist pin pivot axis, and said piston member having a second arcuate bearing surface formed thereon engageable with the eccentric bearing surface on said rod for load transmittal therebetween during oscillation and movement of said connecting rod carrying said piston toward its top center position, disengagement of said bearing surfaces shifting load transmittal to said pin and its journaling surfaces as the piston passes through its top center position and downwardly through its power stroke.

4. In a piston and connecting rod assembly as set forth in claim 3, a bushing rotatably interposed between said connecting rod and piston, said bushing being unloaded during a portion of the period of said bearing engagement.

5. In a piston and connecting rod assembly as set forth in claim 4, means for supplying lubrication to the bearing surfaces of said wrist pin, bushing and connecting rod.

6. In a pivotal connection for a piston and connecting rod assembly, a wrist pin carried by said piston, a bushing journaled on said wrist pin and pivotally mounting one end of the connecting rod, means for supplying lubricant to the pivotal bearing surfaces of said rod, bushing and wrist pin, said connecting rod end having an arcuate bearing surface disposed eccentrically of the wrist pin pivot axis, and said piston member having a second arcuate bearing surface engageable with the bearing surface on said rod for load transmittal therebetween during movement of said connecting rod carrying said piston toward its top center position, disengagement of said bearing surfaces shifting load transmittal to said pin and the pivotal surfaces of said bushing and connecting rod as the piston passes through its top center position and downwardly on its power stroke thereby insuring adequate lubrication between the several load transmitting surfaces.

7. A piston and connecting rod assembly for an internal combustion engine comprising a hollow piston member having a head portion defining a toroidal combustion chamber bowl and a cylindrical skirt portion extending longitudinally from said head portion, said skirt portion having belts of circumferential ring mounting grooves formed adjacent the opposite ends thereof, an annular thrust collar spaced axially of said head portion and concentrically within said skirt portion and structurally interconnected therewith by a plurality of load carrying struts extending axially and arcuately between said collar and bowl defining head portion and radially to the ring groove defining portion of said skirt adjacent the head end thereof, said collar defining a cylindrical journal surface and a laterally extending thrust bearing surface, said piston skirt having a cylindrical journal surface spaced axially and concentrically of said thrust collar, a hollow piston carrier member rotatably mounted within said cylindrical journal surfaces and having a radially extending shoulder thereon in engagement with the thrust bearing surface of said collar, said piston carrier having opposed bosses defining diametrically aligned wrist pin mounting openings, each of said openings having a bushing mounted therein, a wrist pin rotatably mounted within said spaced bushings, a bushing rotatably mounted on said wrist pin intermediate the wrist pin mounting bosses and having at least two angularly spaced ports extending therethrough, a connecting rod having an opening in one end thereof spacedly embracing said pin and bushing, said rod having an oil supply passage intersecting said wrist pin embracing opening and an annular groove opening inwardly on said connecting rod opening and intersecting said oil supply passage, a bearing sleeve mounted within said connecting rod opening and secured thereto for oscillation with the connecting rod, said bearing sleeve having a plurality of angularly spaced radial ports mating with said connecting rod groove on the side thereof facing the piston head, the wrist pin end of said connecting rod having an arcuate cam surface thereon eccentrically of the longitudinal pivot axis of said wrist pin, and a cam follower member mounted in said piston carrier and having an eccentric surface thereon mateable with the cam surface of said rod during a limited portion of the compression or upward stroke of said rod thereby effecting load transmittal therebetween and lifting said pin with respect to said rotatable bushing and connecting rod sleeve to insure adequate lubrication therebetween as the piston approaches its upper limit and passes downwardly during the power stroke thereof.

8. A piston and connecting rod assembly for an internal combustion engine comprising a hollow piston member having a head portion and a cylindrical skirt portion extending longitudinally from said head portion, an annular thrust collar spaced axially of said head portion and concentrically within said skirt portion and structurally interconnected therewith by a plurality of load carrying struts extending longitudinally between said collar and head portion and radially to said skirt portion, said collar defining a cylindrical inner bearing surface and a laterally extending thrust bearing surface, said piston skirt having a cylindrical inner bearing surface spaced axially and concentrically of said thrust collar, a piston carrier rotatably mounted within said cylindrical bearing surfaces and having a radially extending shoulder thereon in engagement with the thrust bearing surface of said collar, said piston carrier having spaced and aligned wrist pin mounting openings, a wrist pin journaled in said openings, a connecting rod having an opening in one end thereof spacedly embracing said pin, said rod having an annular groove opening inwardly on said connecting rod opening and an oil supply passage intersecting said groove, a bearing sleeve secured within said connecting rod opening for oscillation therewith and having spaced radial ports mating with said groove on the side thereof facing the piston head, the wrist pin end of said connecting rod having an arcuate cam bearing surface thereon eccentric of the longitudinally pivot axis of said wrist pin, and a cam follower member carried by said carrier member and having an eccentric surface thereon engageable with the cam bearing surface of said rod during a limited portion of the compression or upward stroke of said rod thereby effecting load transmittal therebetween and lifting said pin with respect to said connecting rod sleeve to insure adequate lubrication therebetween as the piston approaches its upper limit and passes downwardly during the power stroke thereof.

References Cited in the file of this patent
UNITED STATES PATENTS

| | | |
|---|---|---|
| 2,463,025 | Dilworth | Mar. 1, 1949 |
| 3,027,207 | Meurer | Mar. 27, 1962 |

FOREIGN PATENTS

| | | |
|---|---|---|
| 748,735 | Great Britain | May 9, 1956 |